United States Patent
He et al.

(10) Patent No.: US 12,295,008 B2
(45) Date of Patent: *May 6, 2025

(54) METHOD FOR RESOURCE SIGNALING DESIGN AND CONFIGURATION

(71) Applicant: ZTE CORPORATION, Guangdong (CN)

(72) Inventors: Zhen He, Shenzhen (CN); Bo Gao, Shenzhen (CN); Yu Pan, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

This patent is subject to a terminal disclaimer.

(21) Appl. No.: 17/852,080

(22) Filed: Jun. 28, 2022

(65) Prior Publication Data

US 2022/0330216 A1    Oct. 13, 2022

Related U.S. Application Data (63) Continuation of application No. PCT/CN2020/106273, filed on Jul. 31, 2020.

(51) Int. Cl.
*H04W 72/04*     (2023.01)
*H04W 72/08*     (2009.01)
*H04W 72/23*     (2023.01)
*H04W 72/53*     (2023.01)
*H04W 72/542*    (2023.01)

(52) U.S. Cl.
CPC ........... *H04W 72/23* (2023.01); *H04W 72/53* (2023.01); *H04W 72/542* (2023.01)

(58) Field of Classification Search
CPC ... H04W 72/23; H04W 72/53; H04W 72/542; H04B 7/0691; H04B 7/0695; H04B 7/0404
See application file for complete search history.

(56) References Cited

U.S. PATENT DOCUMENTS

| | | | |
|---|---|---|---|
| 2001/0024956 A1 | 9/2001 | You et al. | |
| 2012/0269154 A1* | 10/2012 | Wang | H04W 72/21 370/329 |
| 2019/0379506 A1 | 12/2019 | Cheng | |
| 2020/0120691 A1 | 4/2020 | Siomina et al. | |
| 2020/0221485 A1* | 7/2020 | Cirik | H04L 5/0051 |
| 2022/0187779 A1* | 6/2022 | Wuerr | G05B 19/056 |

(Continued)

FOREIGN PATENT DOCUMENTS

| | | |
|---|---|---|
| CN | 108632885 A | 10/2018 |
| CN | 110225587 A | 9/2019 |

(Continued)

OTHER PUBLICATIONS

AT&T et al., "RAN1 UE features list for Rel-16 NR" 3GPP TSG RAN WG1 #100-e, R1-2000930, Feb. 24, 2020, e-Meeting (158 pages).

(Continued)

*Primary Examiner* — Abdullahi E Salad
(74) *Attorney, Agent, or Firm* — Foley & Lardner LLP (57) ABSTRACT

A wireless communication method for use in a wireless terminal is disclosed. The wireless communication method comprises prioritizing a reception of a first resource when at least one event occurs, wherein the first resource and a second resource overlap in at least one time unit.

18 Claims, 5 Drawing Sheets

(56) References Cited

U.S. PATENT DOCUMENTS

| | | | | |
|---|---|---|---|---|
| 2022/0201566 A1* | 6/2022 | Shrivastava | ............ | H04L 5/0053 |
| 2022/0295515 A1* | 9/2022 | Behravan | ............ | H04W 72/0446 |
| 2022/0312407 A1* | 9/2022 | Guthmann | ............ | H04W 72/02 |
| 2022/0321307 A1* | 10/2022 | Behravan | ............ | H04L 5/0055 |
| 2022/0353023 A1* | 11/2022 | Guthmann | ............ | H04L 1/1861 |
| 2024/0107501 A1* | 3/2024 | Bao | ............ | H04W 76/28 |

FOREIGN PATENT DOCUMENTS

| | | |
|---|---|---|
| CN | 110535583 A | 12/2019 |
| CN | 110710308 A | 1/2020 |
| JP | 2020-533860 A | 11/2020 |
| WO | WO-2020/031335 A | 2/2020 |
| WO | WO-2020/054036 A1 | 3/2020 |
| WO | WO-2020/145609 A1 | 7/2020 |
| WO | WO-2020/148903 A1 | 7/2020 |

OTHER PUBLICATIONS

CATT, "Remaining issues on SRS" 3GPP TSG RAN WG1 Meeting #93, R1-1806286, May 21, 2018, Busan, Korea (4 pages).
CMCC "Maintenance for multi-TRP/panel transmission" 3GPP TSG RAN WG1 #100, R1-2000754, Feb. 24, 2020, e-Meeting (4 pages).
CMCC, "Remaining issues on multi-TRP/panel transmission" 3GPP TSG RAN WG1 #101, R1-2003954, May 25, 2020, e-Meeting (5 pages).
Ericsson, "Introduction of MIMO enhancements" 3GPP TSG-RAN WG2 Meeting #109 electronic, R2-2001896, Feb. 24, 2020, e-Meeting (74 pages).
Ericsson, "Introduction of on-demand SIB(s) procedure in Connected" 3GPP TSG-RAN WG2 Meeting #110-e, R2-2005899, Jun. 1, 2020, e-Meeting (842 pages).
International Search Report and Written Opinion for PCT Appl. No. PCT/CN2020/106273, mailed Apr. 25, 2021 (6 pages).
Lenovo et al., "Remaining issues on multi-TRP/panel transmission" 3GPP TSG RAN WG1 Meeting #101, R1-2003819, May 25, 2020, e-Meeting (13 pages).
LG Electronics, "Text proposals on enhancements on multi-TRP/panel transmission" 3GPP TSG RAN WG1 #101, R1-2003928, May 25, 2020, e-Meeting (11 pages).
Mediatek Inc., "Views on Rel-16 UE Features for NR eMIMO" 3GPP TSG RAN WG1 Meeting #100bis, R1-2001829, Apr. 20, 2020, e-Meeting (11 pages).
Moderator (Apple), "Feature Lead Summary #1 on L1-SINR and SCell BFR" 3GPP TSG RAN WG1 #101, R1-2004231, May 25, 2020, e-Meeting (17 pages).
Moderator (Apple), "Feature Lead Summary on L1-SINR and SCell BFR" 3GPP TSG RAN WG1 #101, R1-2004232, May 25, 2020, e-Meeting (17 pages).
Moderator (Apple), "Feature Lead Summary on L1-SINR and SCell BFR" 3GPP TSG RAN WG1 #101, R1-2004709, May 25, 2020, e-Meeting (12 pages).
Moderator (OPPO), "FL summary #2 for Multi-TRP/Panel Transmission" 3GPP TSG RAN WG1 #101, R1-2004719, May 25, 2020, e-Meeting (35 pages).
Moderator (OPPO), "Fl summary for Multi-TRP/Panel Transmission" 3GPP TSG RAN WG1 #101, R1-2004370, May 25, 2020 e-Meeting (22 pages).
Nokia et al., "Maintenance of Rel-16 Multi-TRP operation" 3GPP TSG RAN WG1 Meeting #101, R1-2004265, May 25, 2020, e-Meeting (16 pages).
NTT Docomo, Inc, "Remaining issues on multi-TRP/panel transmission" 3GPP TSG RAN WG1 #101, R1-2004395, May 25, 2020, e-Meeting (16 pages).
OPPO, "Text proposals for enhancements on Multi-TRP and panel Transmission" 3GPP TSG RAN WG1 #101, R1-2004047, May 25, 2020, e-Meeting (11 pages).
Qualcomm Incorporated, "Multi-TRP Enhancements" 3GPP TSG RAN WG1 #101-e, R1-2004463, May 25, 2020 (11 pages).
Samsung, "On Rel.16 multi-TRP/panel transmission" 3GPP TSG RAN WG1#101-e, R1-2003881, May 25, 2020, e-Meeting (14 pages).
Samsung, "Status Report to TSG" 3GPP TSG RAN Meeting #88e, RP-201255, Jun. 29, 2020, e-Meeting (21 pages).
Vivo, "Discussion on remaining issues on multi-TRP operation" 3GPP TSG RAN WG1 #100bis, R1-2001678, Apr. 20, 2020, e-Meeting (17 pages).
ZTE "Maintenance of enhancements on multi-TRP transmission" 3GPP TSG RAN WG1 Meeting #100-e, R1-2000239, Feb. 24, 2020, e-Meeting (12 pages).
Extended European Search Report for EP Appl. No. 20946778.6, dated Nov. 14, 2022 (10 pages).
First Office Action for CN Appl. No. 202080093937.1, dated Jun. 27, 2024 (with English translation, 17 pages).
Notice of Grounds of Rejection for JP Appl. No. 2022-540569, dated Jul. 9, 2024 (with English translation, 7 pages).
Vivo, "Remaining aspects of PDCCH-based power saving signal", 3GPP TSG RAN WG1 #99, R1-1912049, Nov. 22, 2019, Reno, USA (11 pages).
Notice of Allowance for CN Patent Application No. 202080093937.1 mailed Dec. 4, 2024 (4 pages).
ZTE, "Preliminary views on further enhancement for NR MIMO", 3GPP TSG RAN WG1 Meeting #101-e, R1-2003483, Jun. 5, 2020, e-Meeting (18 pages.).
CMCC, "Remaining issues on multi-TRP/panel transmission", 3GPP TSG RAN WG1 #100bis, R1-2002212, Apr. 30, 2020, e-Meeting (6 pages).
Decision for Rejection for JP Appl. No. 2022-540569, dated Jan. 28, 2025 (with English translation, 10 pages).
Ericsson, "Introduction of MIMO enhancements", 3GPP TSG-RAN WG2 Meeting #109 electronic, R2-2001705, Mar. 6, 2020, Electronic (73 pages).
Ericsson, "Introduction of on-demand SIB(s) procedure in Connected", 3GPP TSG-RAN WG2 Meeting #110-e, R2-2005172, Jun. 12, 2020, Electronic meeting (837 pages).
Samsung, "Enhancements on MIMO for NR" 3GPP TSG RAN Meeting #88e, RP-200618, Jul. 3, 2020, Electronic Meeting (21 pages).

* cited by examiner

Prioritize a reception of a first resource when at least one event occurs, wherein the first resource and a second resource overlap in at least one time unit — 900

FIG. 9

METHOD FOR RESOURCE SIGNALING DESIGN AND CONFIGURATION

CROSS-REFERENCE TO RELATED APPLICATION

This application claims the benefit of priority under 35 U.S.C. § 120 as a continuation of PCT Patent Application No. PCT/CN2020/106273, filed on Jul. 31, 2020, the disclosure of which is incorporated herein by reference in its entirety.

TECHNICAL FIELD

This document is directed generally to wireless communications.

SUMMARY

In 5th generation (5G) new radio (NR) technology, a user equipment (UE) supporting multiple panels may simultaneously receive multiple downlink (DL) channels or reference signals (RSs) by using different beams, which requires different beams of the multiple DL channels or RSs to be associated with different panels. However, if different beams are associated with the same panel at a given time instant, the UE's behavior is unknown and the UE may not be able to resolve this collision.

This document relates to methods, systems, and devices for resource signaling design and configuration.

The present disclosure relates to a wireless communication method for use in a wireless terminal. The wireless communication method comprises:

prioritizing a reception of a first resource when at least one event occurs, wherein the first resource and a second resource overlap in at least one time unit.

Various embodiments may preferably implement the following features:

Preferably, the prioritizing the reception of the first resource comprises at least one of:

receiving only the first resource, or not receiving the second resource.

Preferably, the at least one event comprises at least one of:

the second resource is not configured with a transmission configuration indicator, TCI, state, the second resource is configured with a plurality of TCI states and is not indicated to one of the plurality of TCI states by an activation command, an offset between a physical downlink control channel, PDCCH, scheduling the second resource and the second resource is smaller than a threshold, the second resource does not overlap with at least one of a data resource or a reference signal, RS, resource, wherein the data resource or the RS resource is indicated having a TCI state, first information associated with the first resource is the same as the first information associated with the second resource, or second information associated with the first resource is the same as the second information associated with the second resource.

Preferably, the first information comprises at least one of a panel index or a set.

Preferably, the second information comprises at least one of a control resource set, CORESET, group, a component carrier, CC or a CC group.

Preferably, the first information associated with the first resource comprises the first information associated with a TCI state applicable to the first resource.

Preferably, the first information associated with the second resource comprises the first information associated with a TCI state applicable to the second resource.

Preferably, the TCI state applicable to the first resource comprises a TCI state activated by a media access control control element, MAC-CE, for the first resource.

Preferably, the TCI state applicable to the second resource comprises at least one of a TCI state activated by a MAC-CE for the second resource, a TCI state indicated by downlink control information, DCI, for the second resource, a default TCI of the second resource, or a TCI state configured by a radio resource control, RRC, signaling for the second resource.

Preferably, the first information associated with the first resource comprises the first information associated with a quasi-co-location, QCL, RS applicable to the first resource.

Preferably, the first information associated with the second resource comprises the first information associated with a QCL RS applicable to the second resource.

Preferably, the QCL RS applicable to the first resource comprises at least one of:

a synchronization signal block, SSB, or a channel state information reference signal, CSI-RS, in a TCI state applicable to the first resource, an SSB identified in an initial access procedure for the first resource, an SSB or a CSI-RS identified, for the first resource, in a random access procedure initiated by a reconfiguration with a synchronization procedure, or an SSB identified, for the first resource, in the most recent random access procedure which is not initiated by a PDCCH order triggering a contention-free random access procedure.

Preferably, the QCL RS applicable to the second resource comprises at least one of:

a synchronization signal block, SSB, or a CSI-RS in a TCI state applicable to the second resource, an SSB identified in an initial access procedure for the second resource, an SSB or a CSI-RS identified, for the second resource, in a random access procedure initiated by a reconfiguration with a synchronization procedure, or an SSB identified, for the second resource, in the most recent random access procedure which is not initiated by a PDCCH order triggering a contention-free random access procedure.

Preferably, the first information associated with the first resource comprises the first information associated with the second information associated with the first resource.

Preferably, the first information associated with the second resource comprises the first information associated with the second information associated with the second resource.

Preferably, the first information associated with the first resource comprises the first information associated with third information associated with a QCL RS associated with the first resource.

Preferably, the first information associated with the second resource comprises the first information associated with the third information associated with a QCL RS associated with the second resource.

Preferably, the third information comprises at least one of a random access channel, RACH, occasion or a preamble.

Preferably, the second information associated with the second resource comprises at least one of the second information associated with a CORESET associated with the second resource, a CORESET scheduling the second resource or the second information associated with a default CORESET of the second resource.

Preferably, the first information associated with the first resource comprises the first information associated with the second information associated with the first resource.

Preferably, the first information associated with the second resource comprises the first information associated with the second information associated with a CORESET associated with the second resource.

Preferably, the CORESET associated with the second resource comprises at least one of a default CORESET of the second resource or a CORESET scheduling the second resource.

Preferably, the first information is determined according to at least one of an initial procedure or a random access procedure identifying the QCL RS.

Preferably, the first resource comprises at least one of a control resource, a CORESET, or a PDCCH.

Preferably, the second resource comprises at least one of a control resource, a CORESET, a PDCCH, a data resource, a physical shared channel, PDSCH, an RS resource, an RS, a CSI-RS resource or a CSI-RS.

The present disclosure relates to a wireless terminal, comprising:
  a processor configured to prioritize a reception of a first resource when at least one event occurs,
  wherein the first resource and a second resource overlap in at least one time unit.

Various embodiments may preferably implement the following features:

Preferably, the processor is configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
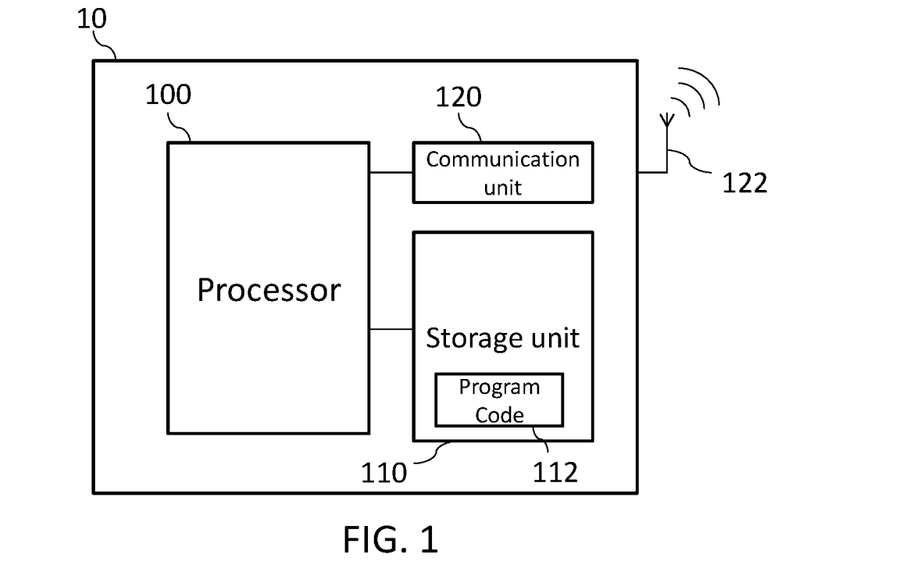
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 212 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
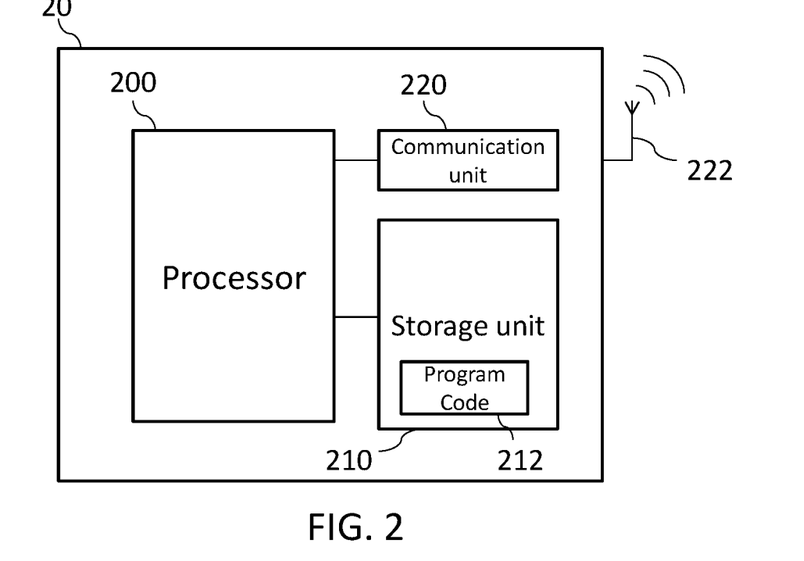
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In the present disclosure, "panel" is equivalent to an antenna group, an antenna port group, a beam group, a sub-array, a UE panel (i.e. a panel of a UE), transmission entity/unit, or reception entity/unit.

In the present disclosure, the definition of "transmission configuration indicator (TCI) state" is equivalent to a quasi-co-location (QCL) state or a QCL assumption. Specifically, "TCI state" is comprised of one or more reference RSs (also called as QCL RSs) and their corresponding QCL type parameters, where the QCL type parameters include at least one of the following aspects or combinations: a Doppler spread, a Doppler shift, a delay spread, an average delay, an average gain, and a spatial parameter. For example, the QCL type include "QCL-TypeD", which is used to represent the same or quasi-co "Spatial parameter" between a targeted "RS or channel" and one or more reference QCL-TypeD RSs. In other words, "Spatial parameter" can also be called a beam.

Specifically, "QCL" or "QCL assumption" includes at least one of the following aspects or combinations: the Doppler spread, the Doppler shift, the delay spread, the average delay, the average gain, and the Spatial parameter.

In the present disclosure, the definition of "control resource set (CORESET) group index" is equivalent to the index of a group including one or more CORESETs, and it can be configured by a higher layer configuration (e.g. CORESETPoolIndex).

In the present disclosure, the definition of "component carrier (CC)" is equivalent to a serving cell or a bandwidth part (BWP) of a CC.

In the present disclosure, the definition of "CC group" is equivalent to a group including one or more CCs, and it can be configured by a higher layer configuration (e.g. simultaneousTCI-UpdateList-r16, simultaneousTCI-UpdateList-Second-r16).

In the present disclosure, the definition of "panel" or "the UE's panel" is equivalent to a physical or logical antenna group or an antenna panel of the UE.

In the present disclosure, "codepoint" occurs (e.g. has) A bits (where A is a positive integer) in downlink control information (DCI) and each codepoint corresponds to an activated TCI state. For example, "codepoint" may be a TCI codepoint, which occurs 3 bits in the DCI and each TCI codepoint (e.g., 000, 001, . . . , 111) corresponds to an activated TCI state applicable to a DL signal.

In the present disclosure, for the convenience of description, "CORESET with the lowest CORESET-ID among CORESETs which are configured with the same CORESET group index as the PDCCH scheduling a data resource or a RS resource, in the latest slot in which the CORESETs within the active BWP of the CC are monitored by the UE" can be called as "default CORESET of the data resource or the RS resource". Further, "TCI state applicable to the default CORESET of the data resource or the RS resource" can be called as "default TCI state of the data resource or the RS resource".

In the present disclosure, the definition of "CORESET" is equivalent to the PDCCH and the DCI.

In the present disclosure, the definition of "PDSCH resource" is equivalent to the PDSCH.

In the present disclosure, the definition of "CSI-RS resource" is equivalent to the CSI-RS.

In the present disclosure, "time unit" may be a sub-symbol, a symbol, a slot, a sub-frame, a frame, a monitoring occasion, or a transmission occasion.

In the present disclosure, "symbol" refers to an orthogonal frequency division multiplexing (OFDM) symbol.

In the present disclosure, "X is associated with Y" means that X and Y have a direct or indirect relationship. For example, X may be determined according to Y and/or Y may be determined based on X.

In the 5G NR, in order to be able to receive multiple different DL channels (e.g., PDCCH/PDSCH) or RSs (e.g., CSI-RS) and/or to transmit multiple different uplink (UL) channels (e.g. PUCCHs/PUSCHs) or RSs (e.g. SRSs) simultaneously by using different (analog) beams, supporting multiple panels has gradually become the basic capability of the UE. In an embodiment, the "panel" refers to a physical antenna panel or an antenna group deployed on the UE and different panels may face different directions in an actual deployment. It should be mentioned that, at a given time instant, only one reception beam (Rx beam) or transmission beam (Tx beam) is formed in a panel. Therefore, for the UE supporting two panels, the UE can use two different Rx beams to simultaneously receive one of the PDCCH, the PDSCH or the CSI-RS and another one of the PDCCH, the PDSCH or the CSI-RS.

Figure 3:
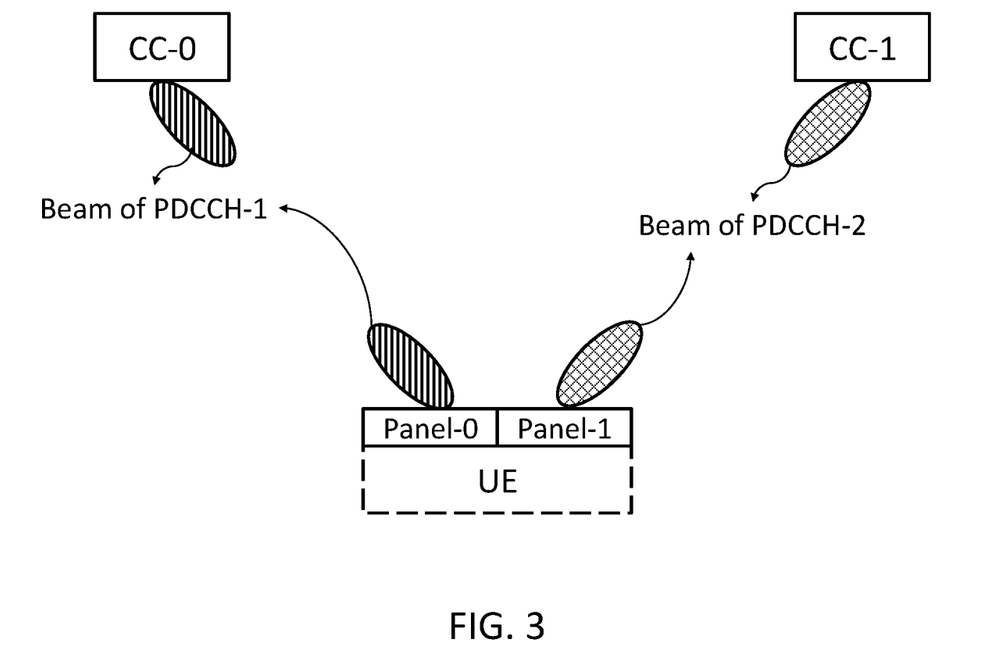
FIG. 3 shows a schematic diagram of a user equipment with 2 panels communicating with two component carriers according to an embodiment of the present disclosure.

FIG. 3 shows a schematic diagram of a UE with 2 panels communicating with 2 CCs according to an embodiment of the present disclosure. Specifically, in carrier aggregation (CA), the UE may simultaneously receive a PDCCH-1 transmitted from a CC-0 and a PDSCH-2 transmitted from a CC-1 by using a beam with vertical stripes and a beam with a grid pattern respectively. In an embodiment, the beam with the vertical strips is obtained according to a QCL RS (e.g., QCL-TypeD-RS) of a TCI state indicated by DCI transmitted from the CC-0. Similarly, the beam with the grid pattern is obtained according to a QCL-TypeD-RS of a TCI state indicated by DCI transmitted from the CC-1. As shown in FIG. 3, the beam with the vertical stripes and the beam with the grid pattern are associated respectively with a Panel-0 and a Panel-1 of the UE. In an embodiment, the PDSCH-1 and the PDSCH-2 may also be transmitted respectively from a transmission-reception points (TRPs) TRP-0 and TRP-1 in the same serving cell.

Figure 4:
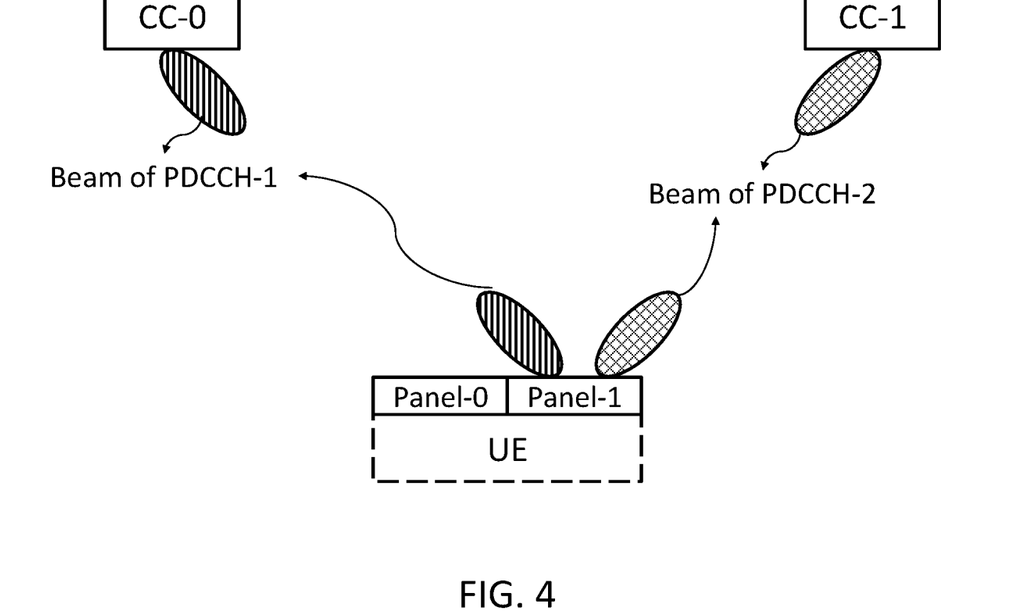
FIG. 4 shows a schematic diagram of a user equipment with 2 panels communicating with two component carriers according to an embodiment of the present disclosure.

FIG. 4 shows a schematic diagram of a UE with 2 panels communicating with 2 CCs according to an embodiment of the present disclosure. In this embodiment, at a given time instant, the beam with the vertical stripes and the beam with the grid pattern are associated with the same panel (i.e. panel-1) and the UE cannot form two different beams in one panel. Even if this situation can be avoided by strictly controlling of the gNB, a situation that is difficult to avoid is that when the two PDCCHs collide (e.g. fully or partially overlap in at least one symbol) and the CORESET corresponding to one PDCCH is not configured with a TCI state. In such conditions, the beam of the PDCCH without configured TCI state needs to follow a synchronization signal block (SSB) identified by the UE during a random/initial access procedure. In addition, another PDCCH is indicated with a TCI-state. Thereby, the two CORESET beams are likely to be associated with the same panel. In such a case, the UE cannot normally receive two DL channels or RSs, resulting in wasting resources and power and degraded performance of the communication system.

In an embodiment, for multiple different channels or RSs transmitted from different CCs in the CA or from different TRPs in single CC, a control channel (e.g., PDCCH) may collide with another control channel (e.g., PDCCH), a data channel (e.g., PDSCH) or an RS (e.g., CSI-RS). That is, one control channel and another control channel, the data channel or the RS channel may be overlapped in at least one OFDM symbol and beams of conflicted channels or RSs are associated with the same panel. In order to clarify the UE's behavior in this collision, the present disclosure provides a method for solving this collision. In an embodiment, the method includes:

the UE is expected to prioritize a reception of a first control resource, if (e.g. when) at least one of the following conditions is met:
the first control resource and a second control resource, a data resource or a RS resource are overlapped in at least one symbol. In an embodiment, the second control resource or (and) the data resource or (and) the RS resource may be collectively called as a second resource for convenience. In addition, the first control resource may be called as a first resource for convenience.
the UE is not provided a configuration of TCI state(s) for the second control resource.
the UE is provided an initial configuration of more than one TCI states for the second control resource and not received a MAC-CE activation command for one of the TCI states.
an offset between a PDCCH scheduling the data resource or the RS resource is less than a threshold. Specifically, the offset refers to one or more time units (e.g., symbols) between the PDCCH scheduling the data resource or the RS resource. The threshold refers to a threshold is determined based on reported UE capability, e.g., a beam switching time (timeDurationForQCL or beamSwitchTiming), a sub-carrier space (SCS) of the RS resource and/or a beam switching timing delay.
there is no other data resource or RS resource with an indicated TCI state in the same symbols as the RS resource.

or
first information associated with the first control resource is the same as the first information associated with the second control resource, the data resource or the RS resource, where the first information includes at least one of a panel index, a set and/or a set index. Specifically, the first information may refer to a UE's panel implicitly or explicitly. For example, a value of the panel index can indicate one UE's panel explicitly. As an alternative, the panel index may be a group ID which is contained in a channel state information (CSI) report based on group, and the group ID indicates the UE's panel implicitly. In an embodiment, the set may be a set of TCI states or RSs configured by a higher layer configuration and each set is associated with one specific UE's panel. In other words, the set indicates one UE's panel implicitly. In an embodiment, the set index refers to an index of a set to which a TCI state or an RS belongs. In addition, the set index indicates one UE's panel implicitly. In an embodiment, "the set associated with A" is equivalent to "the set index associated with A".
second information associated with the first control resource is the same as the second information associated with the second control resource, the data resource or the RS resource, where the second information includes at least one of a CORESET group index, a CC index and/or a CC group. In an embodiment, "the CORESET group index/CC index/CC group index associated with A" is equivalent to "the CORESET group/CC/CC group associated with A".

In an embodiment, the first information associated with the first control resource is the same as the first information associated with the second control resource, the data resource or the RS resource" comprises at least one of the following:
the first information associated with a TCI state applicable to the first control resource is the same as the first information associated with a TCI state applicable to the second control resource, the data resource or the RS resource;
the first information associated with a QCL RS applicable to the first control resource is the same as the first information associated with a QCL RS applicable to the second control resource, the data resource or the RS resource;
the first information associated with the second information associated with the first control resource is the same as the first information associated with the second information associated with the second control resource; or
the first information associated with the second information associated with the first control resource is the same as the first information associated with the second information associated with a control resource associated with the data resource or the RS resource, where the control resource includes at least one of the following: a CORESET scheduling the data resource or the RS resource, a default CORESET of the data resource or the RS resource.

In an embodiment, the TCI state applicable to the first control resource or the second control resource includes:
a TCI state activated by a MAC-CE for the first control resource or the second control resource.

In an embodiment, the TCI state applicable to the data resource includes at least one of the following:
a TCI state indicated by DCI for the data resource; or
a default TCI state of the data resource.

In an embodiment, the TCI state applicable to the RS resource includes at least one of the following:
a TCI state configured by an RRC signaling for the RS resource;
a default TCI state of the RS resource.

In an embodiment, the QCL RS includes at least one of the following:
an SSB or a CSI-RS in a TCI state applicable to the first control resource, the second control resource, the data resource or the RS resource.
an SSB that the UE identified during the initial access procedure;
an SSB or a CSI-RS that the UE identified during the random access procedure initiated by a reconfiguration with synchronization procedure; or
an SSB that the UE identified during the most recent random access procedure not initiated by a PDCCH order that triggers a contention-free random access procedure.

In an embodiment, "the first information associated with the first control resource is the same as the first information associated with the second control resource" comprises at least one of the following:
the first information associated with the second information associated with the first control resource is the same as the first information associated with the second information associated with the second control resource. In other words, the first information is associated with the second information; or
the first information associated with the third information associated with a QCL RS associated with the first control resource is the same as the first information associated with the third information associated with a QCL RS associated with the second control resource, where the third information includes at least one of a random access channel (RACH) occasion and/or a preamble.

In an embodiment, the UE determines the first information during an initial access procedure or a random access procedure for identifying the QCL-RS.

In an embodiment, "second information associated with the first control resource is the same as the second information associated with the data resource or the RS resource":
the second information associated with the first control resource is the same as the second information associated with a CORESET associated with the data resource or the RS resource, where the CORESET includes at least one of a default CORESET of the data resource or the RS resource and a CORESET scheduling the data resource or the RS resource.

In an embodiment, "first information associated with the first control resource is the same as the first information associated with the data resource or the RS resource" comprises:
the first information associated with the second information associated with the first control resource is the same as the first information associated with the second information associated with a CORESET associated with the data resource or the RS resource, where the CORESET includes at least one of a default CORESET of the data resource or the RS resource and a CORESET scheduling the data resource or the RS resource.

In an embodiment, the first control resource includes a CORESET.

In an embodiment, the data resource includes a PDSCH resource.

In an embodiment, the RS resource includes a CSI-RS resource.

In an embodiment, a time domain type of the CSI-RS resource includes aperiodic. That is, the RS resource includes an aperiodic CSI-RS resource.

For illustrations, the method for solving the collision is exemplified by the following embodiments.

Figure 5:
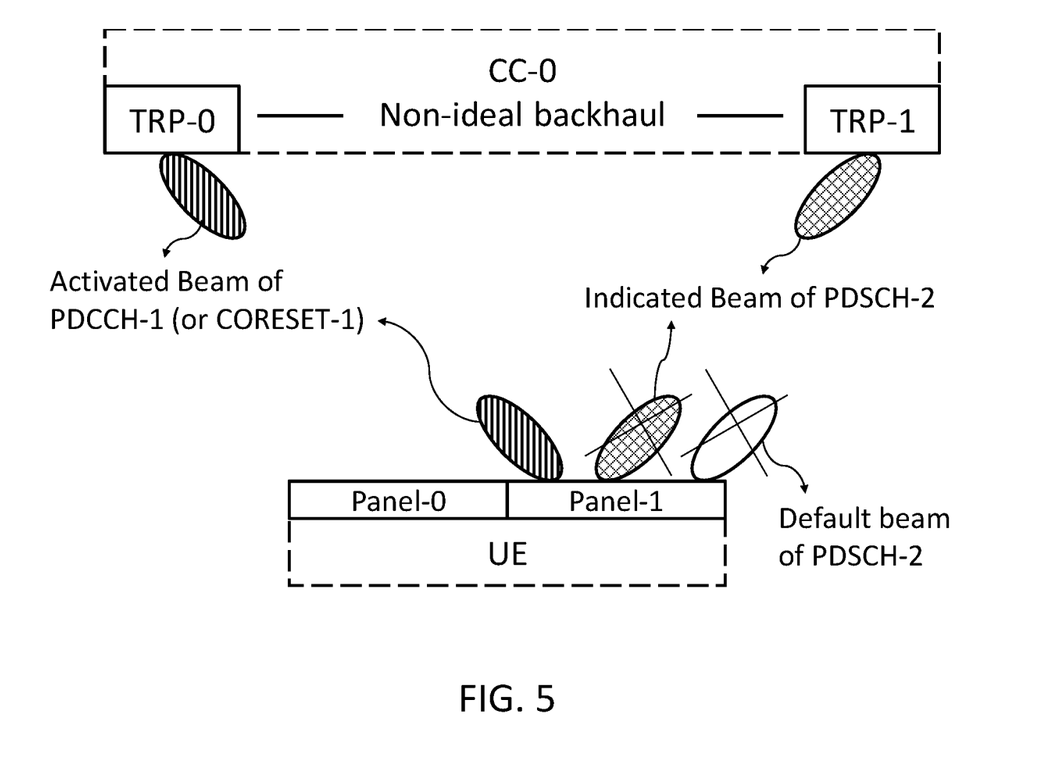
FIG. 5 shows a schematic diagram of a user equipment with 2 panels communicating with two transmission reception points according to an embodiment of the present disclosure.

FIG. 5 shows a schematic diagram of the UE with 2 panels communicating with 2 TRPs according to an embodiment of the present disclosure. As shown in FIG. 5, in a CC-0, at a given time instant, a PDCCH-1 (or a CORESET-1) transmitted from a TRP-0 and a PDSCH-2 transmitted from a TRP-1 overlap. In this embodiment, the gNB activates a TCI state (corresponding to a beam with vertical stripes in the figure) for the CORESET-1 and this TCI state is associated with a panel index having a value of 1. Specifically, the panel index may be configured in the TCI state. In addition, the gNB indicates a TCI-state for the PDSCH-2 and this TCI state is associated with a panel index having a value of 1. In this embodiment, an offset between the reception of DL DCI (or a PDCCH) corresponding to the PDSCH-2 and the PDSCH-2 is smaller than a configured threshold. Thus, the UE cannot receive the indicated TCI state (i.e., the beam with the grid pattern in the figure) of the PDSCH-2 and may apply a default beam (i.e., the beam without pattern) to the PDSCH-2. Note that the default beam is determined according to a default TCI state (i.e., the TCI state applicable to a default CORESET (e.g., CORESET-0). In this embodiment, the default TCI state is associated with a panel index having a value of 1. In other words, the panel index associated with the TCI state associated with CORESET-1 is the same as the panel index associated with the default TCI state associated with the PDSCH-2. Therefore, the beam with vertical stripes and the beam without pattern also conflict. In such a case, the UE is expected to prioritize the reception of the PDCCH-1 by using the beam with vertical stripe by the panel-1. In an embodiment, the panel index may be replaced with a set index.

Figure 6:
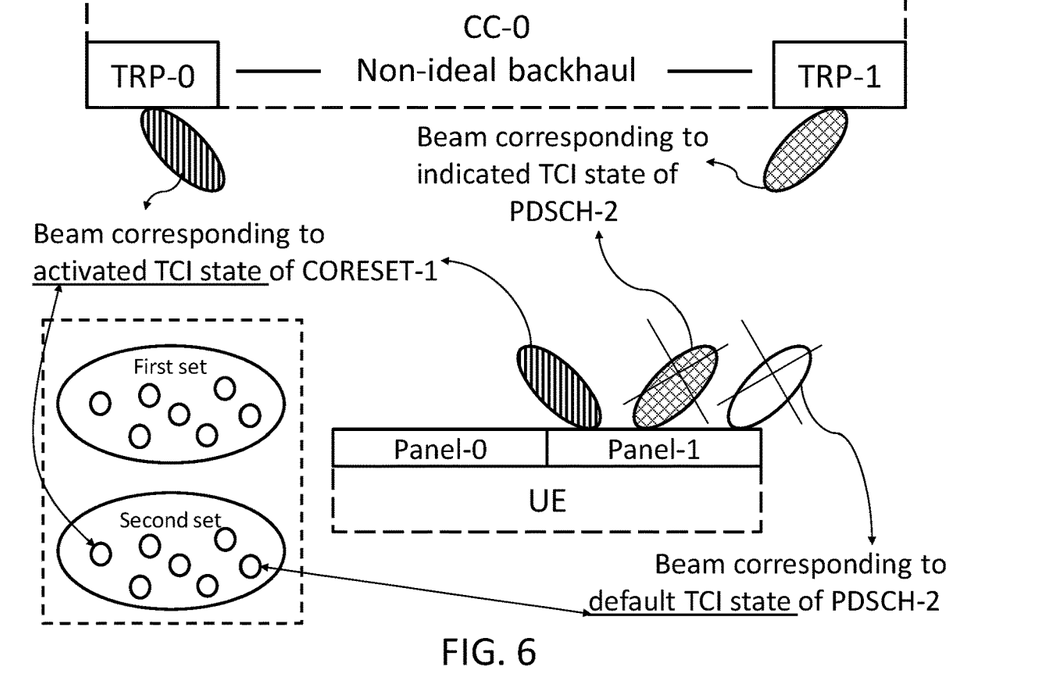
FIG. 6 shows a schematic diagram of a user equipment with 2 panels communicating with two transmission reception points according to an embodiment of the present disclosure.

FIG. 6 shows a schematic diagram of the UE with 2 panels communicating with 2 TRPs according to an embodiment of the present disclosure. As shown in FIG. 6, in a CC-0, there are two sets provided by an RRC signaling, a MAC-CE and/or DCI (i.e. first set and second set) and each of the first set and the second set consists of multiple TCI states (circles shown in FIG. 6). In addition, the first set and the second set are respectively associated with a panel-0 and a panel-1 of the UE. At a given time instant, a PDCCH-1 (or a CORESET-1) transmitted from a TRP-0 and a PDSCH-2 transmitted from a TRP-1 overlap. In this embodiment, the gNB activates a TCI state (corresponds to the beam with vertical stripes) for the CORESET-1 and this activated TCI state belongs to the second set. In addition, the gNB indicates another TCI-state for the PDSCH-2 and the indicated TCI state also belongs to the second set. Moreover, the offset between the reception of DL DCI (or PDCCH) corresponding to the PDSCH-2 and the PDSCH-2 is smaller than a configured threshold. Under such conditions, the UE cannot receive the indicated TCI state (i.e., the beam with grid pattern in the figure) of the PDSCH-2 and needs to apply a default beam (i.e., the beam without pattern in the figure) to the PDSCH-2 and the default beam is determined according to a default TCI state (i.e. the TCI state applicable to a default CORESET (e.g. CORESET-0)). In FIG. 6, the default TCI state also belongs to the second set. In other words, the set associated with the TCI state associated with the CORESET-1 is the same as the set associated with the default TCI state associated with the PDSCH-2. Therefore, the beam with vertical stripes and the beam without pattern conflict. In such a case, the UE is expected to prioritize the reception of the PDCCH-1 by using the beam with vertical stripes.

Figure 7:
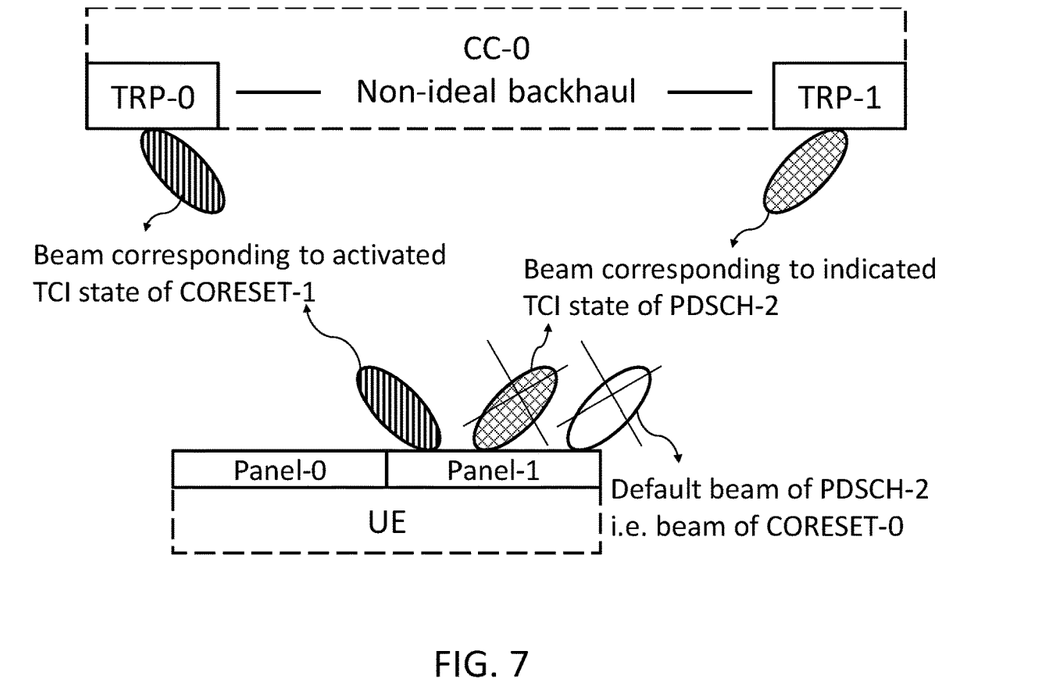
FIG. 7 shows a schematic diagram of a user equipment with 2 panels communicating with two transmission reception points according to an embodiment of the present disclosure.

FIG. 7 shows a schematic diagram of the UE with 2 panels communicating with 2 TRPs according to an embodiment of the present disclosure. As shown in FIG. 7, in a CC-0, there are two CORESET groups: CORESETPoolIndex=0 and CORESETPoolIndex=1 and both of the CORESET groups are associated with the panel index having a value of 1. At a given time instant, a PDCCH-1 (or a CORESET-1) transmitted from a TRP-0 and a PDSCH-2 transmitted from a TRP-1 overlap. In this embodiment, the CORESET-1 is associated with the CORESETPoolIndex=0 and a PDCCH scheduling the PDSCH-2 is associated with the CORESET-PoolIndex=1. In addition, the offset between the reception of DL DCI (or the PDCCH) corresponding to the PDSCH-2 and the PDSCH-2 is smaller than a configured threshold. Thus, the UE cannot receive the indicated TCI state (i.e. the beam with the grid pattern in the figure) of PDSCH-2 and need to apply a default beam (i.e., the beam without pattern in the figure) to the PDSCH-2. In this embodiment, the default beam is determined according to a default TCI state (i.e., a TCI state applicable to a default CORESET (e.g. CORESET-0)) and the CORESET-0 is associated with the CORESETPoolIndex=1. Under such conditions, the panel index associated with the CORESETPoolIndex associated with the CORESET-1 is the same as the panel index associated with the CORESETPoolIndex associated with the default CORESET or the scheduling CORESET associated with the PDSCH-2. Therefore, the beam with vertical stripes and the beam without pattern conflict. In such a case, the UE is expected to prioritize the reception of the PDCCH-1 by using the beam with vertical stripes. In addition, for the collision in the CA, the CORESETPoolIndex may be replaced by a CC index or a CC group in this embodiment.

Figure 8:
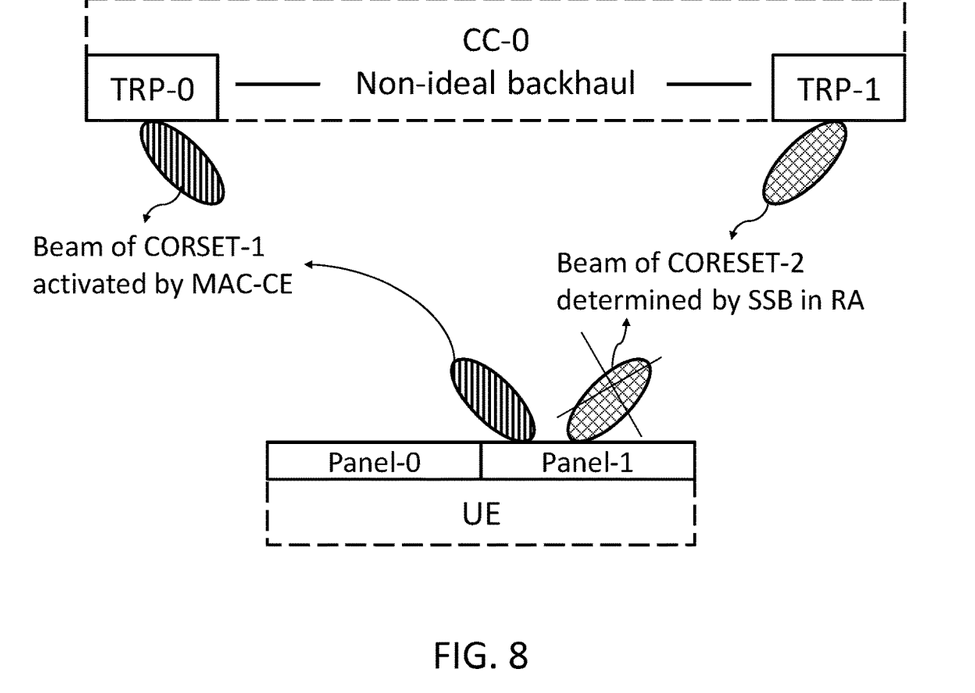
FIG. 8 shows a schematic diagram of a user equipment with 2 panels communicating with two transmission reception points according to an embodiment of the present disclosure.

FIG. 8 shows a schematic diagram of the UE with 2 panels communicating with 2 TRPs according to an embodiment of the present disclosure. As shown in FIG. 8, in a CC-0, at a given time instant, a PDCCH-1 (or a CORESET-1) transmitted from a TRP-0 and a PDCCH-2 (or a CORESET-2) transmitted from a TRP-1 overlap. In this embodiment, the gNB only activates a TCI state (corresponds to the beam with vertical stripes) for a CORESET-1 and the activated TCI state is associated with a panel index having a value of 1. Specifically, the activated panel index may be configured in a corresponding TCI state. In this embodiment, the UE is not provided with an activated TCI state for the CORESET-2 by the gNB and the UE determines a beam of the CORESET-2 according to an SSB which is identified by the UE during the most recent random access procedure (i.e., the closest random access procedure to the CORESET-2). In an embodiment, the SSB may be a QCL-TypeD-RS of the CORESET-2. Note that, a beam of the SSB (e.g. the beam with grid pattern) is associated with a panel index having a value of 1 in this embodiment. That is, the panel index associated with the TCI state associated with the CORESET-1 is the same as the panel index associated with the SSB associated with the CORESET-2. Therefore, the beam with vertical stripes and the beam with grid pattern conflict. In such a case, the UE is expected to prioritize the reception of the PDCCH-1 by using the beam with vertical stripes. In an embodiment, since the SSB is associated with a RACH occasion and/or preamble, the RACH and/or the preamble may also be associated with the same panel index.

Figure 9:
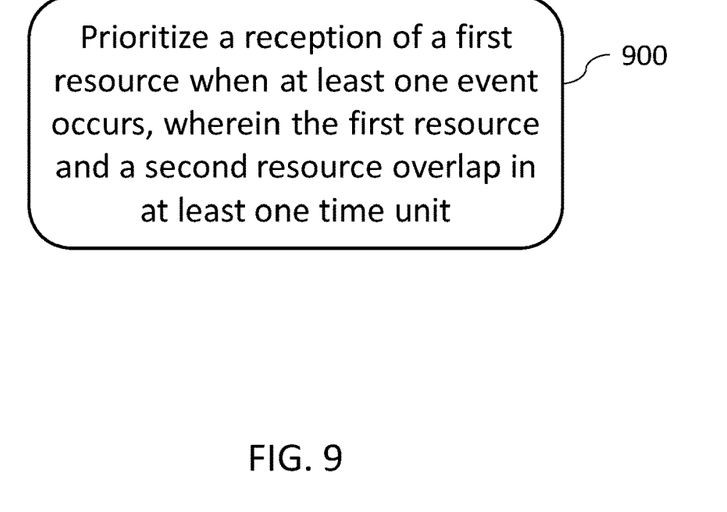
FIG. 9 shows a flowchart of a process according to an embodiment of the present disclosure.

FIG. 9 shows a flowchart of a process according to an embodiment of the present disclosure. The process shown in FIG. 9 may be used in a wireless terminal (e.g. UE) and comprises the following step:

Step 900: Prioritizing a reception of a first resource when at least one event occurs, wherein the first resource and a second resource overlap in at least one time unit.

In the process shown in FIG. 9, when a first resource and a second resource overlap in at least one time unit, the wireless terminal prioritizing a reception of the first resource when at least one event occurs.

In an embodiment, the prioritizing the reception of the first resource means (e.g. comprises) receiving only the first resource and/or not receiving the second resource.

In an embodiment, the at least one event comprises at least one of:
the second resource is not configured with a TCI state,
the second resource is configured with a plurality of TCI states and is not indicated to one of the plurality of TCI states by an activation command,
an offset between a PDCCH scheduling the second resource and the second resource is smaller than a threshold,
the second resource does not overlap with at least one of a data resource or an RS resource, wherein the data resource or the RS resource is indicated having a TCI state,
first information associated with the first resource is the same as the first information associated with the second resource, or
second information associated with the first resource is the same as the second information associated with the second resource.

In an embodiment, the first information comprises at least one of a panel index or a set.

In an embodiment, the second information comprises at least one of a control resource set, CORESET, group, a CC or a CC group.

In an embodiment, the first information associated with the first resource comprises the first information associated with a TCI state applicable to the first resource.

In an embodiment, the first information associated with the second resource comprises the first information associated with a TCI state applicable to the second resource.

In an embodiment, the TCI state applicable to the first resource comprises a TCI state activated by a MAC-CE for the first resource.

In an embodiment, the TCI state applicable to the second resource comprises at least one of a TCI state activated by an MAC-CE for the second resource, a TCI state indicated by DCI for the second resource, a default TCI of the second resource, or a TCI state configured by an RRC signaling for the second resource.

In an embodiment, the first information associated with the first resource comprises the first information associated with a QCL RS applicable to the first resource.

In an embodiment, the first information associated with the second resource comprises the first information associated with a QCL RS applicable to the second resource.

In an embodiment, the QCL RS applicable to the first resource comprises at least one of:

an SSB or a CSI-RS in a TCI state applicable to the first resource, an SSB identified in an initial access procedure for the first resource, an SSB or a CSI-RS identified, for the first resource, in a random access procedure initiated by a reconfiguration with a synchronization procedure, or an SSB identified, for the first resource, in the most recent random access procedure which is not initiated by a PDCCH order triggering a contention-free random access procedure.

In an embodiment, the QCL RS applicable to the second resource comprises at least one of:

an SSB or a CSI-RS in a TCI state applicable to the second resource, an SSB identified in an initial access procedure for the second resource, an SSB or a CSI-RS identified, for the second resource, in a random access procedure initiated by a reconfiguration with a synchronization procedure, or an SSB identified, for the second resource, in the most recent random access procedure which is not initiated by a PDCCH order triggering a contention-free random access procedure.

In an embodiment, the first information associated with the first resource comprises the first information associated with the second information associated with the first resource.

In an embodiment, the first information associated with the second resource comprises the first information associated with the second information associated with the second resource.

In an embodiment, the first information associated with the first resource comprises the first information associated with third information associated with a QCL RS associated with the first resource.

In an embodiment, the first information associated with the second resource comprises the first information associated with the third information associated with a QCL RS associated with the second resource.

In an embodiment, the third information comprises at least one of a random access channel, RACH, occasion or a preamble.

In an embodiment, the second information associated with the second resource comprises at least one of the second information associated with a CORESET associated with the second resource, a CORESET scheduling the second resource or the second information associated with a default CORESET of the second resource.

In an embodiment, the first information associated with the first resource comprises the first information associated with the second information associated with the first resource.

In an embodiment, the first information associated with the second resource comprises the first information associated with the second information associated with a CORESET associated with the second resource.

In an embodiment, the CORESET associated with the second resource comprises at least one of a default CORESET of the second resource or a CORESET scheduling the second resource.

In an embodiment, the first information is determined according to at least one of an initial procedure or a random access procedure identifying the QCL RS.

In an embodiment, the first resource comprises at least one of a control resource, a CORESET or a PDCCH.

In an embodiment, the second resource comprises at least one of a control resource, a CORESET, a PDCCH, a data resource, a PDSCH, an RS resource, an RS, a CSI-RS resource or a CSI-RS.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
   prioritizing a reception of a first resource when at least one event occurs,
   wherein the first resource and a second resource overlap in at least one time unit, and
   wherein the at least one event comprises at least one of:
   the second resource is not configured with a transmission configuration indicator, TCI, state,
   the second resource is configured with a plurality of TCI states and is not indicated to one of the plurality of TCI states by an activation command,
   an offset between a physical downlink control channel, PDCCH, scheduling the second resource and the second resource is smaller than a threshold,
   the second resource does not overlap with at least one of a data resource or a reference signal, RS, resource, wherein the data resource or the RS resource is indicated having a TCI state,
   first information associated with the first resource is the same as the first information associated with the second resource, or
   second information associated with the first resource is the same as the second information associated with the second resource,
   wherein the first information comprises at least one of a panel index or a set, and
   wherein the second information comprises at least one of a control resource set, CORESET, group, a component carrier, CC or a CC group.

2. The wireless communication method of claim 1, wherein the prioritizing the reception of the first resource comprises at least one of:
   receiving only the first resource, or
   not receiving the second resource.

3. The wireless communication method of claim 1, wherein the first information associated with the first resource comprises the first information associated with a TCI state applicable to the first resource, and
   wherein the first information associated with the second resource comprises the first information associated with a TCI state applicable to the second resource.

4. The wireless communication method of claim 3, wherein the TCI state applicable to the first resource comprises a TCI state activated by a media access control control element, MAC-CE, for the first resource, and
   wherein the TCI state applicable to the second resource comprises at least one of a TCI state activated by an MAC-CE for the second resource, a TCI state indicated by downlink control information, DCI, for the second resource, a default TCI of the second resource, or a TCI state configured by a radio resource control, RRC, signaling for the second resource.

5. The wireless communication method of claim 1, wherein the first information associated with the first resource comprises the first information associated with a quasi-co-location, QCL, RS applicable to the first resource, and
   wherein the first information associated with the second resource comprises the first information associated with a QCL RS applicable to the second resource.

6. The wireless communication method of claim 5, wherein the QCL RS applicable to the first resource comprises at least one of:
- a synchronization signal block, SSB, or a channel state information reference signal, CSI-RS, in a TCI state applicable to the first resource,
- an SSB identified in an initial access procedure for the first resource,
- an SSB or a CSI-RS identified, for the first resource, in a random access procedure initiated by a reconfiguration with a synchronization procedure, or
- an SSB identified, for the first resource, in the most recent random access procedure which is not initiated by a PDCCH order triggering a contention-free random access procedure.

7. The wireless communication method of claim 5, wherein the QCL RS applicable to the second resource comprises at least one of:
- a synchronization signal block, SSB, or a CSI-RS in a TCI state applicable to the second resource,
- an SSB identified in an initial access procedure for the second resource,
- an SSB or a CSI-RS identified, for the second resource, in a random access procedure initiated by a reconfiguration with a synchronization procedure, or
- an SSB identified, for the second resource, in the most recent random access procedure which is not initiated by a PDCCH order triggering a contention-free random access procedure.

8. The wireless communication method of claim 1, wherein the first information associated with the first resource comprises the first information associated with the second information associated with the first resource, and
wherein the first information associated with the second resource comprises the first information associated with the second information associated with the second resource.

9. The wireless communication method of claim 1, wherein the first information associated with the first resource comprises the first information associated with third information associated with a QCL RS associated with the first resource,
wherein the first information associated with the second resource comprises the first information associated with the third information associated with a QCL RS associated with the second resource, and
wherein the third information comprises at least one of a random access channel, RACH, occasion or a preamble.

10. The wireless communication method of claim 1, wherein the second information associated with the second resource comprises at least one of the second information associated with a CORESET associated with the second resource, a CORESET scheduling the second resource or the second information associated with a default CORESET of the second resource.

11. The wireless communication method of claim 1, wherein the first information associated with the first resource comprises the first information associated with the second information associated with the first resource,
wherein the first information associated with the second resource comprises the first information associated with the second information associated with a CORESET associated with the second resource, and
wherein the CORESET associated with the second resource comprises at least one of a default CORESET of the second resource or a CORESET scheduling the second resource.

12. The wireless communication method of claim 1, wherein the first information is determined according to at least one of an initial procedure or a random access procedure identifying the QCL RS.

13. The wireless communication method of claim 1, wherein the first resource comprises at least one of a control resource, a CORESET, or a PDCCH.

14. The wireless communication method of claim 1, wherein the second resource comprises at least one of a control resource, a CORESET, a PDCCH, a data resource, a physical shared channel, PDSCH, an RS resource, an RS, a CSI-RS resource or a CSI-RS.

15. A wireless terminal, comprising:
a processor configured to prioritize a reception of a first resource when at least one event occurs,
wherein the first resource and a second resource overlap in at least one time unit, and
wherein the at least one event comprises at least one of:
the second resource is not configured with a transmission configuration indicator, TCI, state,
the second resource is configured with a plurality of TCI states and is not indicated to one of the plurality of TCI states by an activation command,
an offset between a physical downlink control channel, PDCCH, scheduling the second resource and the second resource is smaller than a threshold,
the second resource does not overlap with at least one of a data resource or a reference signal, RS, resource, wherein the data resource or the RS resource is indicated having a TCI state,
first information associated with the first resource is the same as the first information associated with the second resource, or
second information associated with the first resource is the same as the second information associated with the second resource,
wherein the first information comprises at least one of a panel index or a set, and
wherein the second information comprises at least one of a control resource set, CORESET, group, a component carrier, CC or a CC group.

16. The wireless terminal of claim 15, wherein the processor is further configured to:
receive only the first resource, or
not receive the second resource.

17. The wireless terminal of claim 15, wherein the first information associated with the first resource comprises the first information associated with a TCI state applicable to the first resource, and
wherein the first information associated with the second resource comprises the first information associated with a TCI state applicable to the second resource.

18. A non-transitory computer program product comprising a computer-readable program medium code stored thereupon, the code, when executed by a processor, causing the processor to implement a wireless communication method comprising:
prioritizing a reception of a first resource when at least one event occurs,
wherein the first resource and a second resource overlap in at least one time unit, and
wherein the at least one event comprises at least one of:

the second resource is not configured with a transmission configuration indicator, TCI, state, the second resource is configured with a plurality of TCI states and is not indicated to one of the plurality of TCI states by an activation command, an offset between a physical downlink control channel, PDCCH, scheduling the second resource and the second resource is smaller than a threshold, the second resource does not overlap with at least one of a data resource or a reference signal, RS, resource, wherein the data resource or the RS resource is indicated having a TCI state, first information associated with the first resource is the same as the first information associated with the second resource, or second information associated with the first resource is the same as the second information associated with the second resource, wherein the first information comprises at least one of a panel index or a set, and wherein the second information comprises at least one of a control resource set, CORESET, group, a component carrier, CC or a CC group.

* * * * *